(12) United States Patent
Nanavati et al.

(10) Patent No.: US 7,890,950 B1
(45) Date of Patent: Feb. 15, 2011

(54) SOFTWARE UNINSTALLATION THAT INTEGRATES TRANSFER ACTIVATION

(75) Inventors: Mihir Nanavati, Santa Clara, CA (US);
Xuejun Xu, Cupertino, CA (US);
Wilson Chan, San Jose, CA (US);
Nobuo Griffin, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1267 days.

(21) Appl. No.: 11/141,127

(22) Filed: May 31, 2005

(51) Int. Cl.
*G06F 9/445* (2006.01)
*G06F 21/00* (2006.01)

(52) U.S. Cl. ..................... 717/174; 705/51
(58) Field of Classification Search ............ None
See application file for complete search history.

(56) References Cited

U.S. PATENT DOCUMENTS 6,009,401 A * 12/1999 Horstmann .......... 705/1
7,113,912 B2 * 9/2006 Stefik et al. .......... 705/1
2006/0106727 A1 * 5/2006 Yellai et al. .......... 705/59

FOREIGN PATENT DOCUMENTS

| JP | 04-266818 | 9/1992 |
|---|---|---|
| JP | 04-266821 | 9/1992 |
| JP | 06-072864 | 3/1994 |
| JP | 06-327756 | 11/1994 |
| JP | 09-301854 | 11/1997 |
| JP | 11-012167 | 1/1999 |
| WO | WO-02/069942 A1 | 9/2002 |
| WO | WO-2004/019930 A1 | 3/2004 |
| WO | WO-2004/019987 A1 | 3/2004 |
| WO | WO-2004/019988 A1 | 3/2004 |

* cited by examiner

*Primary Examiner*—Michael J Yigdall
*Assistant Examiner*—Evral Bodden
(74) *Attorney, Agent, or Firm*—Schwegman Lundberg & Woessner, P.A.

(57) ABSTRACT

A method, an apparatus and a system perform software uninstallation that integrates transfer activation. In some embodiments, a method includes uninstalling software from a machine that is activated on the machine. The software has a limited number of activations. The uninstalling operation comprises deactivating the software on the machine.

4 Claims, 6 Drawing Sheets

SOFTWARE UNINSTALLATION THAT INTEGRATES TRANSFER ACTIVATION

TECHNICAL FIELD

The application relates generally to data processing, and, more particularly, to uninstalling of software.

BACKGROUND

Upgrades to hardware may not always keep pace with upgrades to software and vice versa. Consumers may upgrade their hardware at a rate that may outpace the upgrades to their software. Accordingly, consumers may attempt to transfer their software on existing hardware to their upgraded hardware. However, allowing the ability to transfer should not allow massive distribution of a single copy of software across a number of different machines. Moreover, consumers typically "clean up" their existing hardware prior to setting aside, selling, donating, etc. The "clean up" may include the uninstallation of software, deletion of files, etc.

SUMMARY

According to some embodiments, a method, an apparatus and a system perform software uninstallation that integrates transfer activation. In some embodiments, a method includes uninstalling activated software on a machine. The activated software has a limited number of activations. The uninstalling comprises deactivating the activated software on the machine.

In some embodiments, a method includes receiving a communication to deactivate a software product from an apparatus as part of an uninstall operation of the software product from the apparatus. The method also includes deactivating a license of the software product for the apparatus based on the communication.

In some embodiments, a method includes uninstalling software from a machine. The uninstalling includes performing a transfer activation of the software from the machine responsive to a determination that a license of the software is valid and responsive to a determination that the software is activated on the machine. The uninstalling also includes performing an advanced uninstall of the software from the machine responsive to a determination that the license of the software is valid or responsive to a determination that the transfer activation was successful.

In some embodiments, a method includes uninstalling an activated software product from a machine. The activated software product has a limited number of activations. The uninstalling comprises deactivating the license of the activated software product from the machine responsive to a determination that the license was activated on the machine during a deactivation time period.

In some embodiments, an apparatus includes a machine-readable medium to store software that is activated on the apparatus, a license of the software, anchor data that associates the software to an identification of the apparatus and an indicator that the software has been installed on the apparatus. The apparatus also includes an uninstall module to uninstall the software from the apparatus. The apparatus includes a transfer activation module to communicate to a server to deactivate the software from the apparatus, based on a transfer activation control command from the uninstall module that is issued as part of the uninstall.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Figure 1:
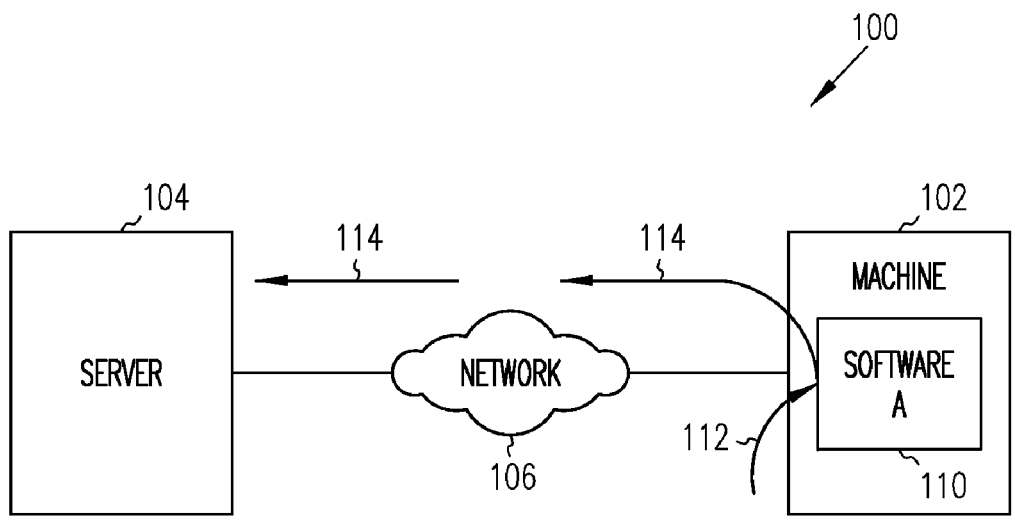
FIG. 1 illustrates a system for software uninstallation that integrates transfer activation, according to some embodiments of the invention.

Methods, apparatus and systems for software uninstallation that integrates transfer activation are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

In some embodiments, copies of software products may include a limited license based on a serial number. In other words, a copy of a software product may not be activated on an unlimited number of machines. While a copy of a software product may be installed on any of a number of machines, in some embodiments, the copy of a software product may only be activated on a limited number of machines. An activation may require communication with a server over a network to allow for execution based on a serial number. The server may return a communication that enables the copy of the software product to be executed. For example, the communication may set some type of enabling flag on the machine to authorize execution. In some embodiments, an activation may be transferred to different machines. For example, if a new machine is purchased, the customer may transfer the activation from an old machine to this new one. This transfer activation may be performed by the server. In particular, the activation is returned to the server. Subsequently, the activation from the new machine may be initiated by the customer and is deemed successfully by the server.

For example, the server may update a data structure that represents the limited activation. The data structure may include the identification of the machine and the copy of the software product that is activated thereon. Therefore, the server may track the number of activations in such a data structure and deny activation if a predetermined number of activations is exceeded. If a transfer activation is received from a machine, the server may delete an entry in this data structure for this particular machine. Accordingly, the transfer activation frees up an activation, thereby allowing an activation for this copy of the software product to occur on a different machine.

Some embodiments incorporate transfer activation of software as part of the uninstallation of the software. Accordingly, the person that is executing the uninstallation of the software is given an option to perform a transfer activation of the software. Therefore, this may reduce customer annoyance as well as the number of communications with customer service. In particular, if the transfer activation is not performed prior to the uninstallation, the person may be required to reinstall the software to subsequently perform the transfer activation. Subsequently, the person may reexecute the uninstallation. The person may not realize that they may not activate the software on a different machine until the transfer activation is performed, which results in communications to customer service to resolve the issue.

FIG. 1 illustrates a system for software uninstallation that integrates transfer activation, according to some embodiments of the invention. In particular, FIG. 1 illustrates a system 100 that includes a machine 102 that is coupled to a server 104 through a network 106. The machine 102 may be representative of any apparatus, computer device, etc. For example, the machine 102 may be a desktop computer, notebook computer, Personal Digital Assistant (PDA), a cellular telephone, etc. The machine 102 includes a software product A 110 that has been installed and activated thereon. A more detailed description of an architecture of the machine 102 and/or the server 104, according to some embodiments, is set forth below. While FIG. 1 employs a client-server architecture, embodiments are not limited to such an architecture. For example, some embodiments may be incorporated into a distributed or peer-to-peer architecture system. The network 106 may be different types of networks including a Local Area Network, Wide Area Network, etc. For example, the network 106 may be the Internet, an Intranet network, an Ethernet-based network, etc.

FIG. 1 also includes a number of operations that may be part of the uninstallation of the software product A 110. The operations include an uninstall operation 112 and a transfer activation operation 114. As shown, in some embodiments, the uninstall operation 112 causes the transfer activation operation 114.

The uninstall operation 112 may be triggered by an input from a user of the machine 102. For example, an uninstall application may have been installed as part of the installation of the software product A 110. Therefore, the user may execute the uninstall application to uninstall the software product A 110.

A transfer activation operation 114 may be integrated into the uninstall operation 112. During the uninstall operation 112, the transfer activation operation 114 may be executed to query the user on whether the user wants to deactivate the software product A 110 from the machine 102 prior to uninstallation.

With regard to the transfer activation operation 114, this activation may include communications with the server 104 over the network 106. Logic in the server 104 may deactivate the license of the software A product 110 for the machine 102. In particular, as described above, in some embodiments, a license of a given software product has a limited number of activations. Accordingly the software product may execute on a limited number of machines. Therefore, in some embodiments, prior to execution, the software product must be activated by the server 104.

While described with reference to an individual copy of a software product, some embodiments may be used to uninstall and/or deactivate multiple individual copies, a software suite that includes copies of different software products, etc. In particular, a suite of software products may include one or more software products.

Figure 2:
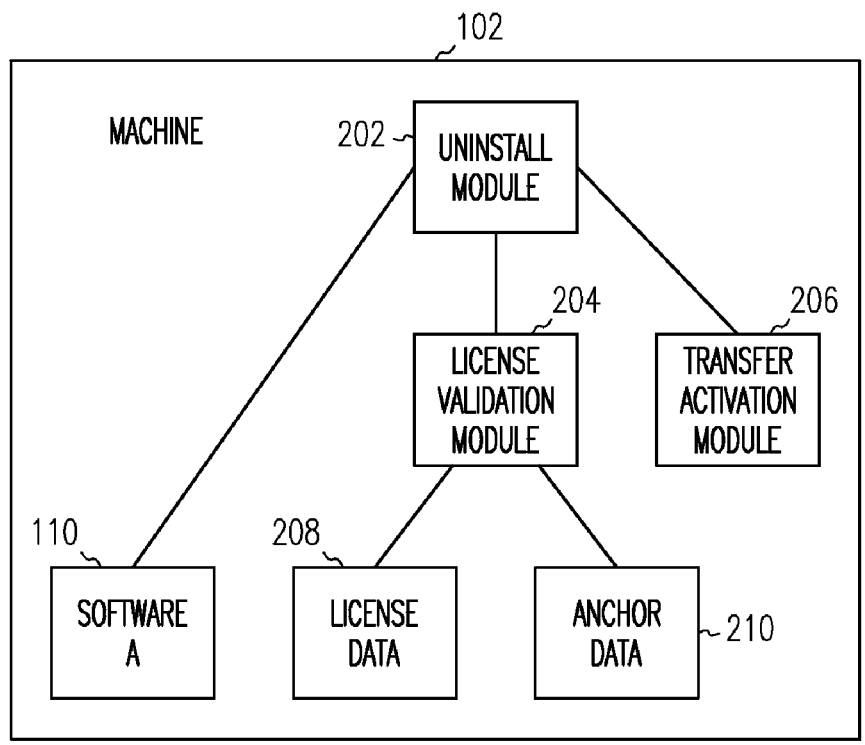
FIG. 2 illustrates a more detailed block diagram of a machine that includes modules to perform software uninstallation that integrates transfer activation, according to some embodiments of the invention.

FIG. 2 illustrates a more detailed block diagram of a machine that includes modules to perform software uninstallation that integrates transfer activation, according to some embodiments of the invention. In particular, FIG. 2 illustrates a more detailed block diagram of the machine 102 of FIG. 1. As shown, the machine 102 includes the software product A 110. The machine also includes an uninstall module 202, a license validation module 204 and a transfer activation module 206. The uninstall module 202, the license validation module 204 and the transfer activation module 206 may be representative of software, hardware, firmware or a combination thereof. For example, the uninstall module 202, the license validation module 204 and the transfer activation module 206 may be software to be executed on a processor (not shown). An example of the machine 102 having this architecture is described in FIG. 4 below. The software product A 110 may also execute on a similar processor. The machine also includes license data 208 and anchor data 210, which may be files, data stored as part of a file, etc. The anchor data 210 may include data indicating the time when the software product was installed on the machine 102. The anchor data 210 may also include data related to activation (whether the software product is activated, when activated, etc.).

Figure 3:
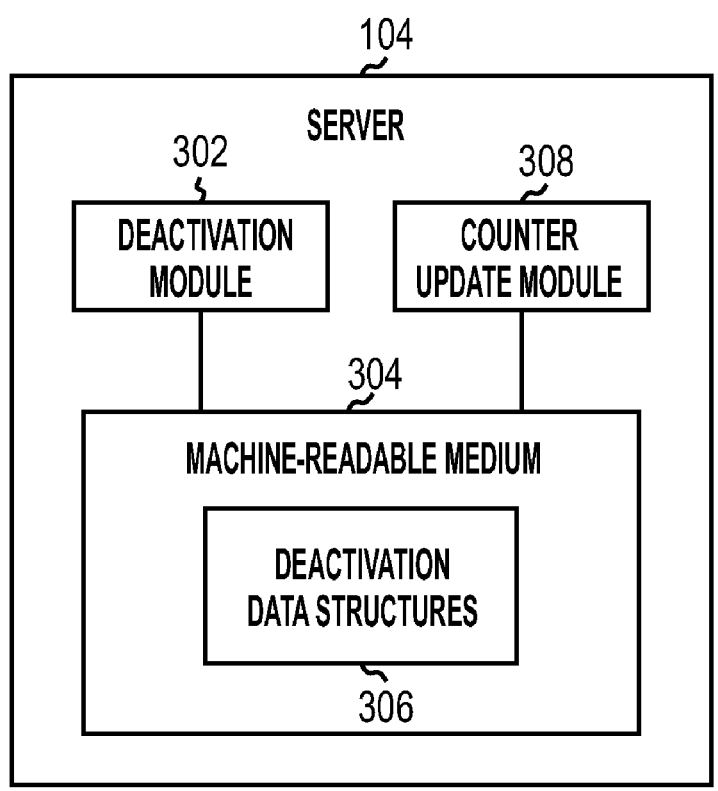
FIG. 3 illustrates a more detailed block diagram of a server that includes modules to perform software uninstallation that integrates transfer activation, according to some embodiments of the invention.

FIG. 3 illustrates a more detailed block diagram of a server that includes modules to perform software uninstallation that integrates transfer activation, according to some embodiments of the invention. In particular, FIG. 3 illustrates a more detailed block diagram of the server 104 of FIG. 1. As shown, the server 104 includes a server deactivation module 302, a counter update module 308 and a machine-readable medium 304. The machine-readable medium 304 stores deactivation data structures 306. The deactivation data structures 306 may be tables, objects, data arrays, etc. The server deactivation module 302 and the counter update module 308 may be representative of software, hardware, firmware or a combination thereof. For example, the server deactivation module 202 and the counter update module 308 may be software to be executed on a processor (not shown). An example of the server 104 having this architecture is described in FIG. 7 below.

The server deactivation module 302 may track activations/deactivations based on a unique identification of the machine or a component therein. For example, in some embodiments, the unique identification may be a machine disk identifier. The machine disk identifier is a value that is calculated based on information related to the hard disk drive (e.g., identifications of sectors or tracks of the hard disk drive). The server deactivation module 302 may also track activations/deactivations based on an identification of a processor of the machine, the amount of memory, etc. In some embodiments, the server deactivation module 302 may also track activations/deactivations based on any combination of those identifications listed above. The server deactivation module 302 may store these unique identifications along with a unique serial number for the license of the software product into the deactivation data structures 306. The counter update module 308 may perform delayed updates (relayed to activation of software) to activation counters stored in the deactivation data structures 306 for one or more licenses of such software.

Figure 4:
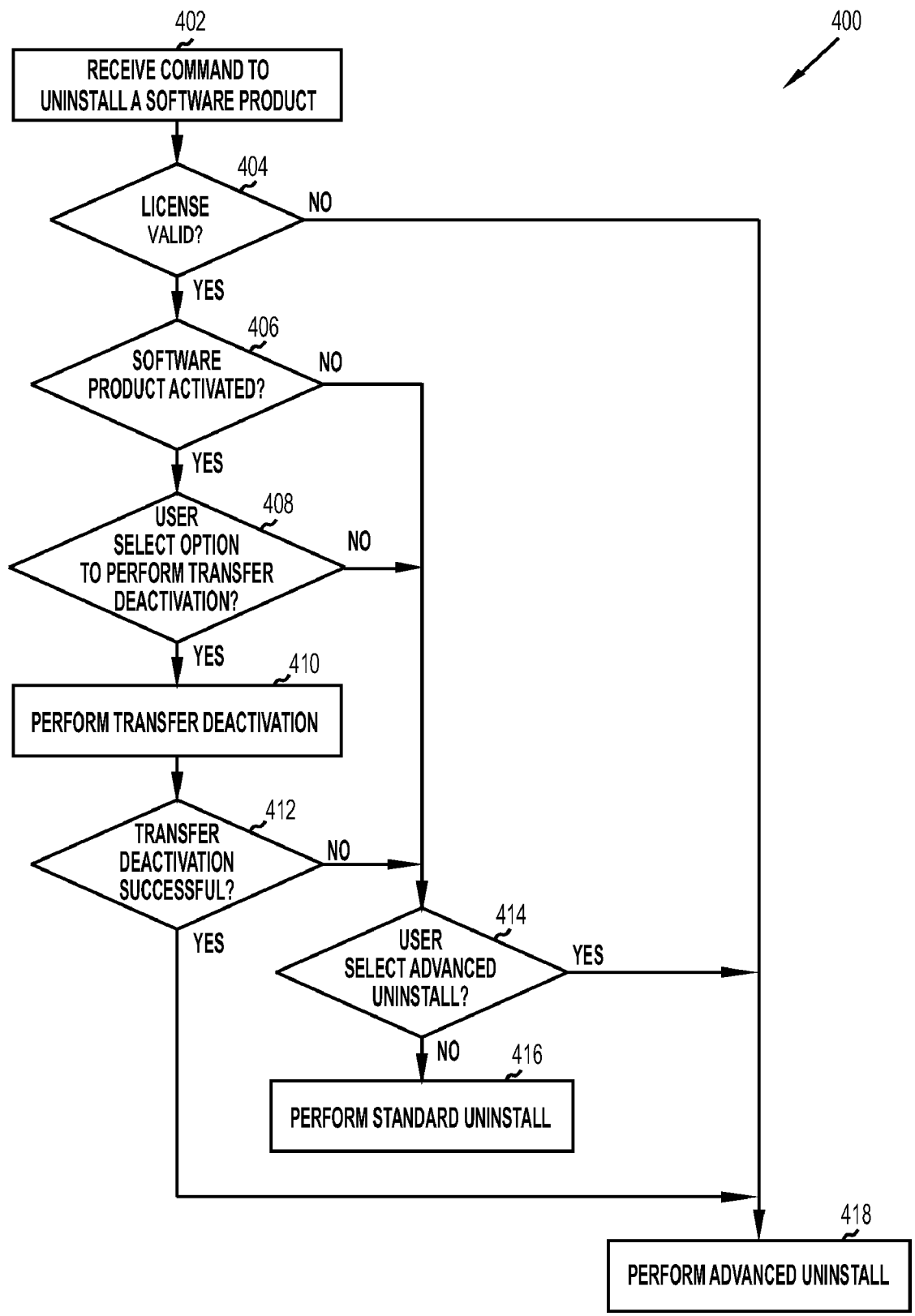
FIG. 4 illustrates a flow diagram for software uninstallation that integrates transfer activation, according to some embodiments of the invention.

A more detailed description of the operations for software uninstallation that includes transfer activation, according to some embodiments, is now described. FIG. 4 illustrates a flow diagram for software uninstallation that integrates transfer activation, according to some embodiments of the invention. The flow diagram 400 is described with reference to the components of FIGS. 1-3. The flow diagram 400 commences at block 402.

At block 402, the uninstall module 202 receives a command to uninstall a software product that is installed on the machine 102. For example, the command may be generated from an uninstall application that is executed by a user of the machine 102 to uninstall the software product A 110. The flow continues at block 404.

At block 404, the license validation module 204 determines whether the license of the software product A 110 is valid. Once the command to uninstall is received, the uninstall module 202 may call the license validation module 204 to perform this determination. The license validation module 204 may make this determination by validating the license data 208. For example, the license validation module 204 may check whether a valid value is stored for the license in the license data 208. Upon determining that the license of the software product A 110 is not valid, the flow continues at block 418, which is described in more detail below. Upon determining that the license of the software product A 110 is valid, the flow continues at block 406.

At block 406, the license validation module 204 determines whether the software product A 110 is activated. In some embodiments, the license validation module 204 determines whether the anchor data 210 includes an indication that the software product A 110 has been activated. In some embodiments, the software product A 110 may be executed on the machine 102 for a trial period without requiring the software to be activated. This may be any predetermined time period (e.g., 30 days) from the time of installation. The data representative of this predetermined time period may be stored in the anchor data 210. Therefore, if the software product A 110 is not activated, the license validation module 204 may check the anchor data 210 if the software product A 110 has been installed within the predetermined time period. In some embodiments, if the software product A 110 is activated or the software product A 110 has been installed within the predetermined time period, the license of the software product A 110 is considered activated. Upon determining that the software product A 110 is not activated, the flow continues at block 312, which is described in more detail below. Upon determining that the software product A 110 is activated, the flow continues at block 408.

At block 408, the uninstall module 202 determines whether the user (that initiated the uninstall) has selected an option to perform a transfer activation of the software product A prior to the uninstall. The uninstall module 202 may cause a Graphical User Interface (GUI) window to be opened on a monitor of the device 102 that allows the user to make the selection. Upon determining that the user did not select the option to perform the transfer activation, the flow continues at block 414, which is described in more detail below. Upon determining that the user did select the option to perform the transfer activation, the flow continues at block 410.

At block 410, the transfer activation module 206 performs the transfer activation of the software product A 110. The transfer activation module 206 may transmit a communication to the server deactivation module 302 on the server 104 (which is shown as the transfer activation operation 114 in FIG. 1. The communication may include the serial number associated with the software product A 110 and the identification of the machine 102. The communication includes an indication that the software product A 110 is to be deactivated for the machine 102. As described above, the server deactivation module 302 may update the deactivation data structures 306 to reflect this deactivation. The server deactivation module 302 may transmit a communication back to the transfer activation module 206 that is indicative of whether the transfer activation was successful. The flow continues at block 412.

At block 412, the transfer activation module 206 determines whether the transfer deactivation of the software product A 110 was successful. The transfer activation module 206 may make this determination based on if a successful communication is received back from the server deactivation module 302 of the server 104. The transfer activation may not be successful if the network 106 or the server 104 is not operational, if the data that the server deactivation module 302 is to update is not accessible, corrupted, etc., if the data transmitted over the network is corrupted, etc. Upon determining that the transfer activation was successful, the flow continues at block 418, which is described in more detail below. Upon determining that the transfer activation was not successful, the flow continues at block 414.

At block 414, the uninstall module 202 determines whether the user selected an advanced uninstall of the software product A 110. The uninstall module 202 may cause a GUI window to be opened on a monitor of the device 102 that allows the user to make the selection. Upon determining that the user did select the advanced uninstall, the flow continues at block 418, which is described in more detail below. Upon determining that the user did not select the advanced uninstall, the flow continues at block 416.

At block 416, the uninstall module 202 performs the standard uninstall of the software product A 110. As part of the standard uninstall, the uninstall module 202 may remove application files, update registry data, etc. However, the uninstall module 202 does not remove the data related to the activation of the copy of the software product A 110 and the anchor data 210. Accordingly, the standard uninstall operation preservers the activation data on the machine, which allows users to reinstall the copy of the software product A 110 without reactivating of the software. A standard uninstall operation may be executed for users who plan on re-installing the software product on the same machine. The flow diagram 400 is then complete.

At block 418, the uninstall module 202 performs the advanced uninstall of the software product A 110. As part of the advanced uninstall, the uninstall module 202 may remove application files, update registry data, etc. In addition, the uninstall module 202 may remove the activation data. In some embodiments, the uninstall module 202 may remove all data and files associated with the software product A, except for the data (stored in the anchor data 210) that indicates that the software has been installed and time of installation. Such data may remain to preclude users from cyclically installing and uninstalling the software to stay within the trial period.

Accordingly, the users are required to activate the software. The user may select the advanced uninstall operation if the trial period has expired and the user has not activated the software. The user may also select the advanced uninstall operation if the user has already transferred the activation. The user may select the advanced uninstall operation if the license of the software is corrupt and requires reactivation. The flow diagram 400 is then complete.

Embodiments are not limited to the operations shown in the flow diagram 400. For example, in some embodiments, if the software product is part of a software suite, a transfer activation may not be performed. Rather, a standard uninstall of the software product is performed without a transfer activation.

Figure 5:
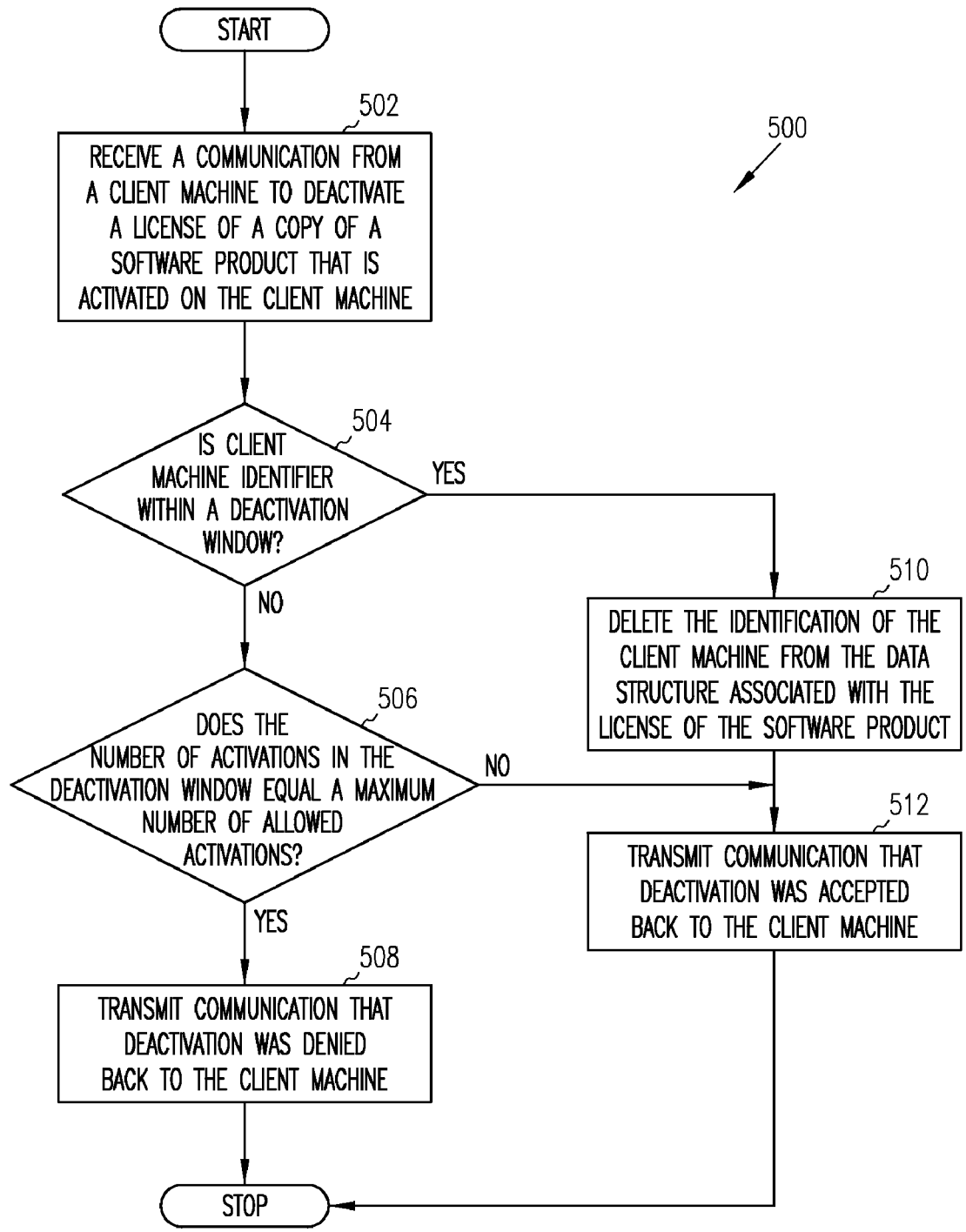
FIG. 5 illustrates a flow diagram for software deactivation based on a deactivation time period, according to some embodiments of the invention.

A more detailed description of the operations of a software uninstallation that includes software deactivation based on a deactivation time period, according to some embodiments, is now described. In particular, FIG. 5 illustrates a flow diagram for software deactivation based on a deactivation time period, according to some embodiments of the invention. The flow diagram 500 illustrates the operations for deactivating software on a machine. The flow diagram 500 is described with reference to the components of FIGS. 1-3. With reference to the flow diagram 400 of FIG. 4, the operations of the flow diagram 500 may be part of the operations at blocks 410 and 412. The flow diagram 500 commences at block 502.

At block 502, the server deactivation module 302 of the server 104 receives a communication from a client machine to deactivate a license of a software product that is activated on the client machine. With reference to FIG. 1, the machine 102 may transmit a communication to the server 104 that initiates the operation. The sever deactivation module 302 receives this communication. The flow continues at block 504.

At block 504, the server deactivation module 302 determines whether the identification of the client machine is within a deactivation time period. The server deactivation module 302 may retrieve the deactivation data structure 306 that is associated with the license of the software product attempting to be deactivated. The server deactivation module 302 may determine the deactivation time period based on the current day. For example, if the period of the deactivation time period is six months, the server deactivation module 302 may define that deactivation time period as the last six months starting from the current day. Therefore, the definition of the deactivation time period is a dynamic time period that is dependent on the time in which an activation/deactivation is to be performed.

In some embodiments, the deactivation data structure 306 may store the history of all activations and deactivations for the particular license. As described above, in some embodiments, a limited number of activations for a license is available within a given deactivation time period. Based on the history stored in the deactivation data structure 306, the server deactivation module 302 may determine whether the identification of the current client machine requesting deactivation is activated for the deactivation time period. Upon determining that the identification of the client machine is within the deactivation time period, the flow continues at block 510, which is described in more detail below. Upon determining that the identification of the client machine is not within the deactivation time period, the flow continues at block 506.

At block 506, the server deactivation module 302 determines whether the number of activations in the deactivation time period equals a maximum number of allowed activations. As described above, the deactivation data structure 306 that is associated with the license of the software product attempting to be deactivated may store this number of activations in the deactivation time period. The maximum number of allowed activations may be any value and may be set by the developers and publishers of the software. Therefore, this maximum number may vary based on the type of software. This maximum number may also vary for a same software product, depending on the license received. Upon determining that the number of activations in the deactivation time period does not equal the maximum number of allowed activations, the flow continues at block 512, which is described in more detail below. Upon determining that the number of activations in the deactivation time period does equal the maximum number of allowed activations, the flow continues at block 508.

At block 508, the server deactivation module 302 transmits a communication that the deactivation was denied back to the client machine. The machine attempting to be deactivated is not one of the machines in the deactivation time period. Also, the number of machines activated in the deactivation time period is equal to the maximum number of allowed activations for this license. The operations of the flow diagram 500 are complete.

At block 510, the server deactivation module 302 deletes the identification of the client machine from the data structure associated with the license of this software product. In particular, because the identification of the client machine is within the deactivation time period, the server deactivation module 302 is accepting the attempt to deactivate the license on this particular client machine. The flow continues at block 512.

At block 512, the server deactivation module 302 transmits a communication that the deactivation was accepted back to the client machine. Accordingly, the license of the software that was deactivated may now be activated on a different client machine.

Also, the operations of block 512 may occur after the operations of block 506. Specifically, even if the identification of the client machine is not within the deactivation time period, the server deactivation module 302 may transmit this communication back to the client machine indicating acceptance. As shown, this may occur if the number of activations in the deactivation time period is less than the maximum number of allowed activations for this license. Therefore, through this path in the flow diagram 500, there are no updates to the deactivation data structure 306. However, the server deactivation module 302 still transmits a communication back to the client machine indicating that the deactivation was accepted. Accordingly, the license of the software that was attempting to be deactivated may now be activated on a different client machine. The operations of the flow diagram 500 are complete.

Figure 6:
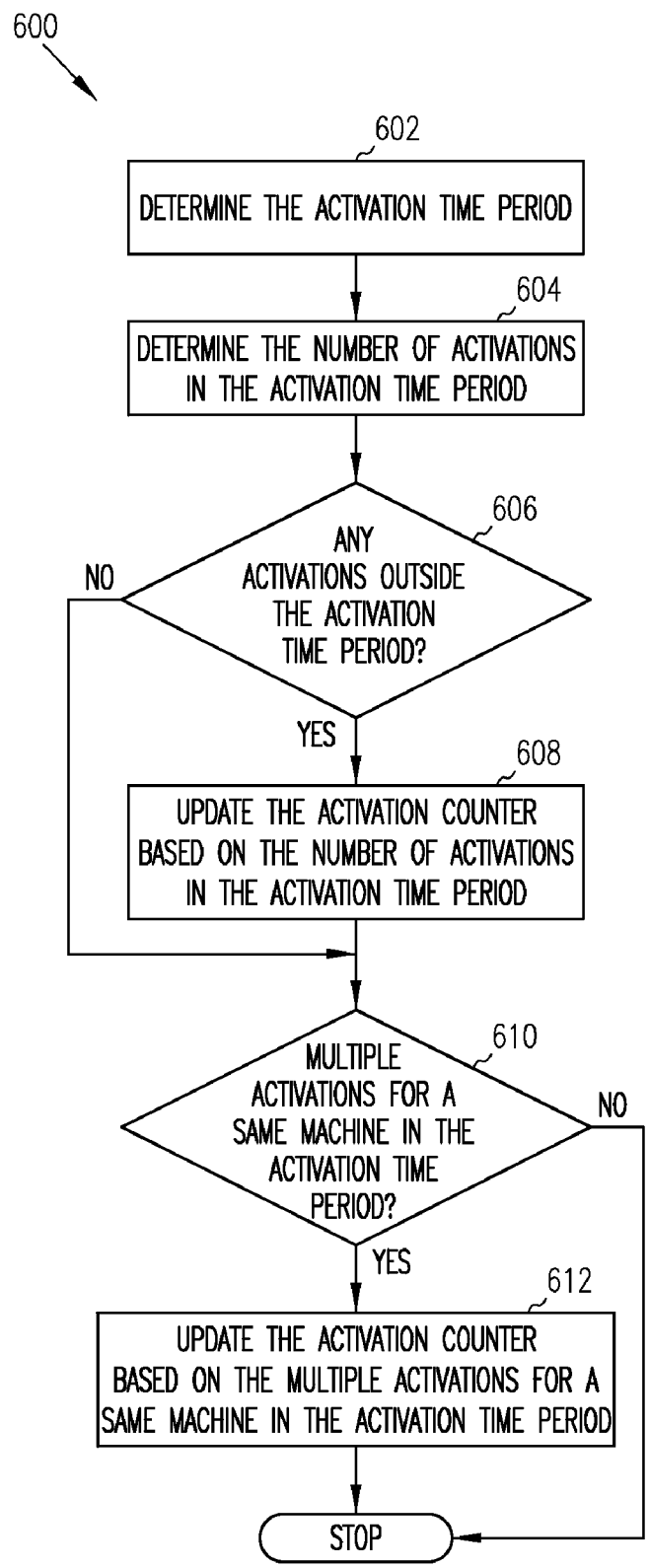
FIG. 6 illustrates a flow diagram for delayed updates to the counter for software activation, according to some embodiments of the invention.

A more detailed description for delayed operations (relative to the software activation) for updating the activation counter for software activation and deactivation is now described. In particular, the activation counter for software activation and deactivation may be updated based on an activation time period, subsequent to the deactivation described in the flow diagram 500 of FIG. 5. FIG. 6 illustrates a flow diagram for delayed updates to the counter for software activation, according to some embodiments of the invention. The flow diagram 600 illustrates the operations of the counter update module 308. In some embodiments, these operations may be performed periodically and during an off-peak time of day. For example, these operations may be performed once a night at 12:00 a.m. While described with reference to updating the activation counter for one software application, in some embodiments, the counter update module 308 performs these operations for any of a number of software applications. For example, in some embodiments, the counter update module 308 may update all of the activation counters (for the different software applications) stored in the activation data structures 306.

At block 602, the counter update module 308 determines the activation time period for the software application. The activation time period may be stored in the entry in the activation data structures 306 associated with the software application. As described above, the activation time period may be a time period starting from the present and looking back a given period (e.g., three months, six months, 12 months, etc.). The flow continues at block 604.

At block 604, the counter update module 308 determines the number of activations in the activation time period. The counter update module 308 may determine this number based on the data stored in the activation data structures 306. The server deactivation module 302 may store the date of activation for each machine for a given serial number of a software application. The flow continues at block 606.

At block 606, the counter update module 308 determines whether there are any activations outside the activation time period. In particular, if any activations are outside the activation time period, the counter update module 308 needs to update the activation counter for this software application. Upon determining that there are no activations outside the activation time period, the flow continues at block 610, which is described in more detail below. Upon determining that there are activations outside the activation time period, the flow continues at block 608.

At block 608, the counter update module 308 updates the activation counter based on the activation time period. In particular, the activation counter may include activations outside the activation time period. In some embodiments, the server deactivation module 302 updates the activation counter independent of the activation time period. Accordingly, the time to complete the activation is less (in comparison to if the server deactivation module 302 included the activation time period in the determination of deactivation shown in FIG. 5. Therefore, the counter update module 308 updates the number of activation based on the number of activations in the activation time period. For example, if five activations were performed in the activation time period and if four activations were outside the activation time period, the server deactivation module 302 would have set the activation counter to nine. Therefore, the counter update module 308 sets the activation counter to five (based on the activation in the activation time period). The flow continues at block 610.

At block 610, the counter update module 308 determines whether there are multiple activations for a same machine in the activation time period. The counter update module 308 may make this determination based on the data stored in the table in the activation data structures 306 for this software application. The table may store the identification of the machines on which the activation is performed. Upon determining that there are no multiple activations for a same machine in the activation time period, the operations of the flow diagram 600 are complete. Upon determining that there are multiple activations for a same machine in the activation time period, the flow continues at block 612.

At block 612, the counter update module 308 updates the activation counter based on the multiple activations for a same machine in the activation time period. For example, if the same machine was updated 20 times in the activation time period, the counter update module 308 marks this as only a single activation. Thus, in some embodiments, for each unique machine activated in the activation time period, the counter update module 308 increments the activation counter by one. The operations of the flow diagram 600 are complete.

Therefore, as described in FIG. 6, some embodiments may perform software uninstallation that integrates transfer activation, wherein the activation counter for one or more software applications may be update at a later point in time relative to the transfer activation.

Figure 7:
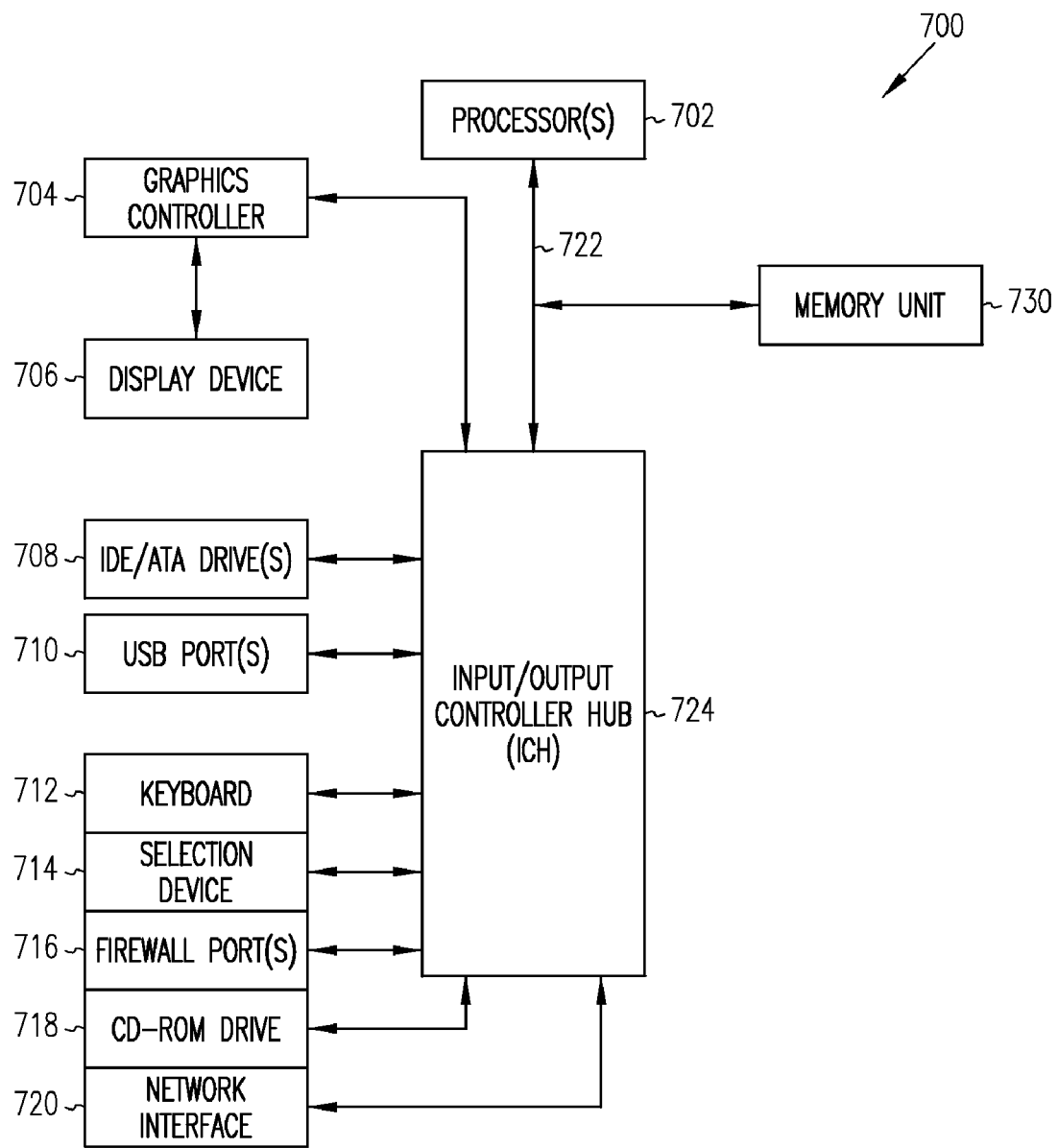
FIG. 7 illustrates a computer device that executes software for performing operations related to software uninstallation that integrates transfer activation, according to some embodiments of the invention.

An embodiment wherein software performs operations related to software uninstallation that integrates transfer activation as described herein is now described. In particular, FIG. 7 illustrates a computer device that executes software for performing operations related to software uninstallation that integrates transfer activation, according to some embodiments of the invention. FIG. 7 illustrates a computer device 700 that may be representative of the machine 102 or the server 104.

As illustrated in FIG. 7, the computer system 700 comprises processor(s) 702. The computer system 700 also includes a memory unit 730, processor bus 722, and Input/Output controller hub (ICH) 724. The processor(s) 702, the memory unit 730, and the ICH 724 are coupled to the processor bus 722. The processor(s) 702 may comprise any suitable processor architecture. The computer system 700 may comprise one, two, three, or more processors, any of which may execute a set of instructions in accordance with embodiments of the invention.

The memory unit 730 may store data and/or instructions, and may comprise any suitable memory, such as a random access memory (DRAM). For example, the memory 730 may be a Synchronous RAM (SRAM), a Synchronous Dynamic RAM (SDRAM), DRAM, a double data rate (DDR) Synchronous Dynamic RAM (SDRAM), etc. The computer system 700 also includes IDE drive(s) 708 and/or other suitable storage devices. A graphics controller 704 controls the display of information on a display device 706, according to some embodiments of the invention.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments of the invention, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, mouse 714, CD-ROM drive 718, or other suitable devices through one or more firewire ports 716. In some embodiments, the ICH 724 also provides a network interface 720 though which the computer system 700 can communicate with other computers and/or devices. The ICH 724 is connected to a wireless interface, which enables the computer system 700 to wirelessly connect to computing devices using any suitable wireless communication protocol (e.g., 802.11b, 802.11g, etc.).

In some embodiments, the computer system 700 includes a machine-readable medium that stores a set of instructions (e.g., software) embodying any one, or all, of the methodologies described herein. Furthermore, software can reside, completely or at least partially, within memory unit 730 and/or within the processor(s) 702.

With reference to FIGS. 1 and 2, the memory 730 and/or one of the IDE/ATA drives 708 may store the uninstall module 202, the license validation module 204, the transfer activation module 206, the software product 110, the license data 208, the anchor data 210, the server deactivation module 302, the counter update module 308 and the deactivation data structures 306. In some embodiments, the uninstall module 202, the license validation module 204, the transfer activation module 206, the software product 110, the server deactivation module 302 and the counter update module 308 may be instructions executing within the processor(s) 702. Therefore, the uninstall module 202, the license validation module 204, the transfer activation module 206, the software product 110, the server deactivation module 302 and the counter update module 308 may be stored in a machine-readable medium that are a set of instructions (e.g., software) embodying any one, or all, of the methodologies described herein. For example, the uninstall module 202, the license validation module 204, the transfer activation module 206, the software product 110, the server deactivation module 302 and the counter update module 308 may reside, completely or at least partially, within the memory 730, the processor(s) 702, one of the IDE/ATA drive(s) 708, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or nonvolatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for software uninstallation that integrates transfer activation, in accordance with some embodiments of the invention. A number of flow diagrams illustrate the operations for software uninstallation that integrates transfer activation, in accordance with some embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   using one or more computer processors, receiving at a server, a transfer activation control command from a first machine;
   directing, by the server, responsive to the transfer activation control command, the following activities, the directing including updating a data structure in a database at the server;
   a standard uninstall of software from the first machine responsive to a determination
      that the license to the software is valid on the first machine, and
      that the software is not activated on the first machine, and
      that an advanced uninstall option has not been selected, the standard uninstall of the software comprising removing data associated with the software on the first machine that were added to the first machine as part of installation of the software, but enabling a user to reinstall the copy of the software on the first machine without reactivating the software, the enabling a user to reinstall including not removing data related to the activation of the copy of the software;
   performing a transfer activation of the software from the first machine responsive to a determination:
      that a standard uninstall is not to be performed, and
      that a license to the software is valid on the first machine, and
      that the software is activated on the first machine;
   performing an advanced uninstall of the software from the first machine responsive to a determination that the transfer activation was successful,
      the advanced uninstall comprising removing data associated with the software on the first machine that were added to the first machine as part of the installation of the software, but precluding a user from cyclically installing and uninstalling the software to stay within a trial period, the precluding a user from cyclically installing and uninstalling including not removing an indicator that the software had previously been installed on the first machine and the time of the installation; and enabling the installation of the software on a second machine.

2. The method of claim 1, the data that were associated with the software on the first machine comprising a file to store license data associated with the software and a file to store anchor data that associates the software to an identification of the first machine, including registration data of the software in a registry file.

3. A computer-readable nontransitory storage device having embedded therein a set of instructions which, when executed by one or more processors of said computer causes said computer to execute the operations comprising:

Receiving by a server a transfer activation control command from a first machine;

directing, by the server, responsive to the transfer activation control command, the following activities, the directing including updating a data structure in a database at the server:

a standard uninstall of software from the first machine responsive to a determination that the license to the software is valid on the first machine, and that the software is not activated on the first machine, and that an advanced uninstall option has not been selected, the standard uninstall of the software comprising removing data associated with the software on the first machine that were added to the first machine as part of installation of the software, but enabling a user to reinstall the copy of the software on the first machine without reactivating the software, the enabling a user to reinstall including not removing data related to the activation of the software on the first machine;

performing a transfer activation of the software from the first machine responsive to a determination that a standard uninstall is not to be performed, and that a license to the software is valid on the first machine, and that the software is activated on the first machine;

performing an advanced uninstall of the software from the first machine responsive to a determination that the transfer activation was successful, the advanced uninstall comprising removing data associated with the software on the first machine that were added to the first machine as part of installation of the software, but precluding a user from cyclically installing and uninstalling the software to stay within a trial period, the precluding a user from cyclically installing and uninstalling including not removing an indicator that the software had previously been installed on the first machine and the time of the installation; and enabling the installation of the software on a second machine.

4. The computer-readable nontransitory storage device of claim 3, the data that were associated with the first machine comprising a file to store license data associated with the software and a file to store anchor data that associates the software to an identification of the machine, including registration data of the software in a registry file.

* * * * *